United States Patent [19]

Wei et al.

[11] 4,052,542

[45] Oct. 4, 1977

[54] HALO-ACETYL HIGH GREEN STRENGTH RUBBERS

[75] Inventors: Yung-Kang Wei; Zbigniew Jack Lobos, both of Sarnia, Canada

[73] Assignee: Polysar Limited, Sarnia, Canada

[21] Appl. No.: 670,967

[22] Filed: Mar. 26, 1976

[51] Int. Cl.$^2$ ............................ C08F 8/18; C08F 8/00
[52] U.S. Cl. ........................................ 526/46; 526/16; 526/298; 526/312; 526/338
[58] Field of Search ................ 526/46, 16, 338, 298, 526/312

[56] References Cited
U.S. PATENT DOCUMENTS 3,904,580   9/1975   Lasis et al. .............................. 526/46

*Primary Examiner*—William F. Hamrock
*Attorney, Agent, or Firm*—Stevens, Davis, Miller & Mosher

[57] ABSTRACT

Synthetic rubber compositions of improved green strength are prepared by reacting a rubbery polymer containing small amounts of tertiary amine groups bound in the polymer chain with a dihalogen compound having halogen groups located in the molecule of the compound in conjugated relationship to a carbonyl group. An example of a suitable rubbery polymer is a terpolymer of butadiene, styrene and dimethylanunoethyl methacrylate. An example of a suitable dihalogen compound is 4,4'-bis (bromoacetyl) diphenyl.

13 Claims, No Drawings

HALO-ACETYL HIGH GREEN STRENGTH RUBBERS

This invention relates to synthetic rubbers of high green strength.

High green strength in a rubber composition is of importance in a number of applications such as tire manufacture, where the rubber composition must withstand deformation and extension prior to curing. Green strength is a term applied to denote the strength, cohesiveness and dimensional stability of rubber compounds before they are cured or vulcanized.

There have recently been proposed certain novel, synthetic rubber compositions having improved green strength, which nevertheless process at elevated temperatures as normal synthetic rubbers. These novel synthetic rubbers comprise the reaction product of a rubbery polymer containing a small amount of tertiary amine groups incorporated therein, and a dihalogen compound such as dibromobutene-2. These rubbers appear to have labile cross-links formed by reaction between the tertiary amine groups of the polymer chains and the dihalogen compound to give a rubber of high green strength at room and slightly elevated temperatures. On heating or shearing, however, the rubber processes as a normal rubbery polymer, with the labile cross-links reforming when the rubber is cooled.

Examples of such tertiary amine group containing rubbery polymers are polymers of styrene, butadiene and a tertiary amine group conaining monomer such as dimethylaminoethyl acrylate, diethylaminoethyl acrylate, dimethylaminoethyl methacrylate and diethylaminoethyl methacrylate, and polymers of acrylonitrile, butadiene and such tertiary amine group containing monomers, the polymer containing from about 0.5 millimoles to about 10 millimoles of bound tertiary amine groups per 100 grams of polymer.

Whilst such high green strength rubbers have proved useful and effective in practice, the dihalogen compounds used to react with the tertiary amine group containing polymers have presented problems. The dihalogen compounds previously reported as most preferred in forming the aforementioned labile cross-links, have been found to be difficult materials to handle effectively, on the commercial scale in this application. One of the problems is a low melting point with high vapour pressure for dibromobutene-2, which melts in the region of 47°–51° C, which is close to the temperatures encountered in the coagulation of the rubbery polymer and below the temperatures used for mixing of the rubbery polymer with other rubber compounding ingredients, e.g. in the banbury, two of the preferred alternatives in the process where it is most convenient to add the dihalogen cross-linking agent. Moreover, the vapour of dibromobutene-2 and of dibromoxylene, another previously preferred compound, is most obnoxious, on account of its lachrymatory nature, rendering it difficult to work with on a commercial scale. The ready vapourization of the dihalogen compound from the rubber during processing leads to substantial and uncontrollable losses of the compound, resulting in a degree of irreproducibility in the green strength in the rubber compound to which it is added. In addition, the previous dihalogen compounds do not incorporate efficiently into the polymer at the latex coagulation stage.

The present invention provides high green strength synthetic rubbers prepared by reacting rubbery synthetic polymers containing tertiary amine groups with improved dihalogen cross-linkers.

Thus according to the present invention, there is provided a synthetic rubber composition of improved green strength, comprising a rubbery polymer of $C_4$–$C_6$ conjugated diolefin (e.g. butadiene) or a rubbery polymer thereof with a $C_8$–$C_{10}$ vinyl or vinylidene substituted aromatic hydrocarbon (e.g. styrene) or with a $C_3$–$C_5$ vinyl compound having a nitrile group (e.g. acrylonitrile), having from about 0.5 millimoles to about 10 millimoles per hundred grams of polymer of bound tertiary amine groups in the polymer molecule, the polymer having been reacted with a diahalogen compound having a general formula selected from the group consisting of

and

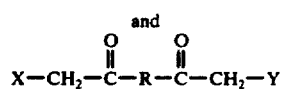

where X and Y each represent one of chlorine, bromine or iodine, and where R represents (a) an alkylene group selected from $CH_2$, $CH_2$—$CH_2$, $CH(CH_3)$ and $C(CH_3)_3)_2$, or b) an aromatic group selected from

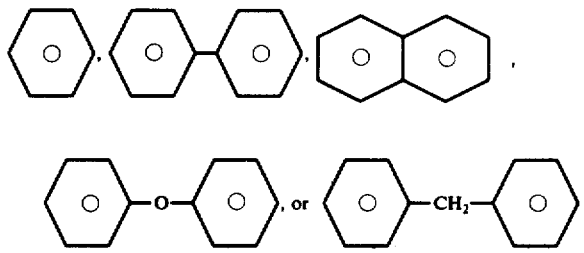

, each of which may additionally contain one or more $C_1$ to $C_4$ alkyl substituents on any of the aromatic nuclei, and the location of each

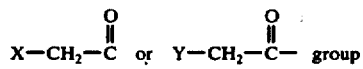

being at any of the ortho-, meta- or para- positions of the aromatic nucleus and in separate aromatic nuclei except where R represents

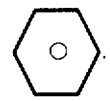

The dihalogen compounds used in the present invention have two halogen groups located in the molecular structure of the compound in conjugated relationship to a carbonyl group. The preferred dihalogen compounds are those in which X and Y are the same and are selected from chlorine or bromine.

Specific examples of dihalogen compounds for use in the present invention include the following:

4,4' - bis (Bromoacetyl) diphenyl methane

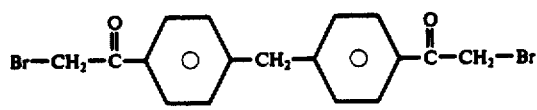

4,4' - bis (Bromoacetyl) diphenyl

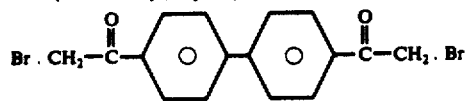

2,6' - bis (Bromoacetyl) naphthalene

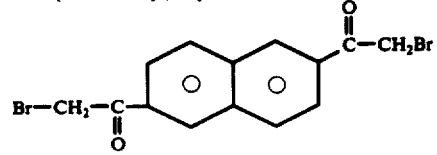

4,4' - bis (Bromoacetyl) diphenyl ether

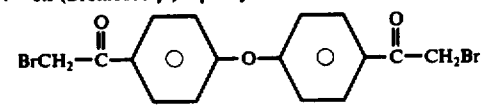

4,4' - bis (chloroacetyl) diphenyl methane

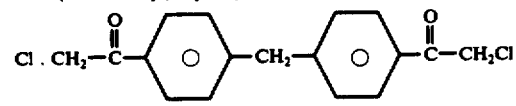

4,4' - bis (iodoacetyl) diphenyl methane

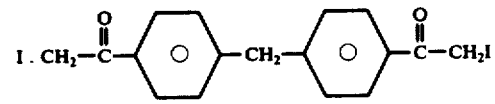

1,4' - dibromobutane - 2,3 - dione

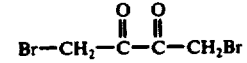

1,5' - dibromopentane - 2,4 - dione

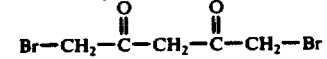

1,5' - dibromo - 3,3 - dimethyl - pentane - 2,4-dione

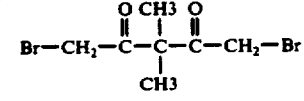

1,4, - bis (Bromoacetyl) - benzene

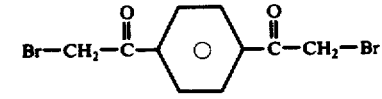

Dibromo and dichloro compounds are generally to be preferred to di-iodo compounds on the grounds of cost. Dibromo compounds appear to cause more rapid development of green strength than the corresponding dichloro compounds.

The most preferred dihalogen compounds for use in the present invention are 4,4' - bis (chloroacetyl) diphenyl methane, 4,4' - bis (bromoacetyl) diphenyl, and 4,4' - bis (bromoacetyl) diphenyl ether.

The use of the dihalogen compounds according to the present invention shows significant important advantages over the use of previously proposed dihalogen compounds such as dibromobutene-2. The irritating odour of dibromobutene-2 is avoided. Generally the compounds have satisfactorily low vapour pressures and high melting points, so that they are convenient and acceptable to work with under commercial rubber manufacturing conditions. Low vapour pressure means that, under conditions of factory preparation and handling of the rubber compositions according to the present invention, less of the dihalogen compound is vapourized and therefore present in the atmosphere. In addition to this, the vapour itself is much less irritant, so that in the working environment such compounds are much to be preferred to dibromobutene-2. The most preferred dihalogen compounds according to the present invention show a greatly improved efficiency of reaction with the rubbery polymers under latex coagulation conditions and on mixing with the dry rubber. They have a suitable degree of reactivity with tertiary amine groups combined in the synthetic rubbery polymer so as to form cross-links between the polymer chains by reaction of the halogen groups and tertiary amine groups, in the latex stage, in a rapid but controllable manner. However, the cross-links so formed are labile in nature, and reversible, as previously described. The resulting high green strength rubber processes under normal shear and elevated temperatures, on a rubber mill or in a banbury mixer, as a normal synthetic rubber, the cross-links being reformed on cooling to room temperature, to confer high green strength on the rubber when cool. The green strength at room temperature and at temperatures up to about 50° C of the compositions according to the invention are much improved as compared with conventional synthetic rubbers, whilst the other known properties of the basic polymers are not significantly affected. Moreover, the presence of the residues of the dihalogen compounds according to the present invention, in the rubber compositions, does not deleteriously affect the curing characteristics of the rubber on subsequent vulcanization, to any significant extent. The factory processability of the rubber compounds is essentially unaffected. The labile cross-links are thus quite different in nature from the permanent cross-links formed on curing the rubber, e.g. with sulphur and accelerators.

The synthetic rubbery polymers with which the present invention is used are generally those previously described in connection with the use of previously proposed dihalogen cross-linkers. They are conjugated diolefin rubbery polymers based upon $C_4$-$C_6$ conjugated diolefins. Examples include: polybutadiene, polyisoprene, and rubbery polymers of at least one conjugated diolefin selected from butadiene-1, 3; isoprene; piperylene; and 2,3-dimethyl-butadiene-1,3; with at least one monomer selected from styrene, alphamethylstryene, and the vinyl toluenes, and from acrylonitrile and methacrylonitrile. The preferred polymers for use in the present invention are rubbery polymers of butadiene and styrene (SBR) and rubbery polymers of butadiene and acrylonitrile (NBR), and so further detailed description of the invention will have specific reference to these polymers.

The preferred rubbery SBR polymers used in the present invention have bound butadiene contents of from 60 – 85% by weight, most preferably from 70 – 82% by weight, most preferably from 70 – 82% by weight and bond styrene contents of from 40 – 15% by weight, most preferably from 30 – 18% by weight, largely in accordance with normal SBR used in tire and general goods manufacture. The preferred NBR polymers are rubbery polymers containing from about 50 – 80%, most preferably 60 – 75% by weight bound content and from about 20 – 50% by weight, most preferably 25 – 40% by weight, bound acrylonitrile content. These polymers are also largely in accordance with normal NBR used in mechanical goods manufacture.

The tertiary amine groups are introduced into the rubbery polymer by copolymerizing with the butadiene and styrene or acrylonitrile a small amount of a copolymerizable monomer having tertiary amine groups in the molecule, which amine groups are substantially unaffected by the polymerization. Suitable such tertiary amine group containing monomers are: dimethylaminoethyl acrylate and dimethyl-aminoethyl methacrylate, and the corresponding diethyl compounds. These monomers readily copolymerize with butadiene and styrene or acrylonitrile in a conventional emulsion polymerization system, and have polymerization reactivity similar to that of the other polymerizing monomers. A polymer is obtained having tertiary amine groups distributed along and amongst the polymer chains.

The polymers are conveniently produced by aqueous emulsion polymerization, in accordance with normal methods, i.e. at a pH of 7 – 11 using a free radical initiator system. The distribution of the tertiary amine groups along and among the polymer molecules can be influenced by the means of addition to the polymerization system of the amine group containing monomer. The amine monomer may be added together with the other polymerizable monomers, before the polymerization is started, in which case the amine groups tend to be concentrated in the lower molecular weight polymer molecules. The amine monomer may be added toward the end of the polymerization in which case the amine groups tend to be found in the higher molecular weight polymer molecules. The amine monomer may be added incrementally during the polymerization whereby the amine groups tend to be randomly distributed along and amongst the polymer molecules, this generally being the preferred method of addition.

After polymerization, the polymer is reacted with the dihalogen compound. It is convenient to add the halogen compound to the polymerization latex, after termination of the polymerization, i.e. at the coagulation stage. Coagulation commonly takes place by adding the polymerization latex to a mixture of acid and electrolyte, e.g. brine/acid, or an acidic electrolyte such as calcium chloride one effect of which addition is to lower the pH of the latex to the acid range. Oil or plasticizer is commonly added at this stage also, to make an oil extended or plasticized rubber. The dihalogen compound is preferably added to the latex at the coagulation stage, under acidic pH conditions, i.e. after at least a part of the brine/acid or electrolyte addition, so as to minimize the risk of hydrolysis of the dihalogen compound. Conveniently, the cross-linker may be added as a solution or dispersion in mineral oil.

The dihalogen compounds used according to the present invention undergo fast and efficient chemical reaction with the tertiary amine group containing polymer under these coagulation conditions. Such fast reaction of the dihalogen compound is advantageous. It ensures rapid chemical bonding of the halogen compound to the polymer, and thereby reduces the chances of losses of the compound from the reaction mixture by vapourization prior to reaction. More efficient and controllable utilization of the dihalogen compound is thereby achieved.

In addition, the halogen compound can also be added to the polymer after its recovery from the latex, such as during the drying of the rubber or during a milling operation in the process of preparing the rubber for packaging. Alternatively, the halogen compound may be added to the polymer along with other compounding ingredients, e.g. on a rubber mill or in an internal mixer.

The amounts of tertiary groups in the polymer and the amount of halogen compound cross-linker, in relation to each other and to the overall amount of polymer, are significant. It is desirable to have approximate chemical equivalence of tertiary amine groups and halogen groups on the halogen compound. However, one can if desired use a polymer containing a relatively large amount of bound tertiary amine groups, and use only small amounts of halogen compound required to give the necessary amount of labile cross-links for the improved green strength required. By having a known excess of tertiary amine groups in the polymer, one can then control the desired green strength by adding controlled amounts of halogen compound. For economic reasons, however, large excesses of either material should be avoided. Preferred amounts of the halogen compound are such that it contains at least 0.1 and not more than 10 millimoles of halogen groups per 100 grams of polymer, and in the most preferred amoung of halogen compound is that which contains from 2.5 – 7.5 millimoles of halogen groups per 100 grams of polymer.

The amount of tertiary amine groups on the polymer is relatively small, in the range of from about 0.5 millimoles to about 10 millimoles, preferably from about 0.75 millimoles to about 7.5 millimoles and most preferably from about 2.5 to about 7.5 millimoles, of tertiary amine groups per 100 grams polymer. The minimum is dictated by the requirement that satisfactory green strength be achieved in the rubber composition, by the formation of at least a minimum number of labile cross-links. The maximum amount is somewhat more flexible. However, it is necessary to ensure that too many labile cross-links are not formed, otherwise the Mooney viscosity of the rubber composition will become so high that the easy factory processibility of the compound is lost.

The most preferred tertiary amine group containing monomer for use in the present invention is dimethyl-aminoethyl methacrylate. This monomer is best incorporated in the rubbery polymer in amounts from about 0.1 to about 1.2 parts by weight per 100 parts by weight of polymer.

The tertiary amine group containing polymers used in the present invention are solid elastomeric materials of high molecular weight, preferably having a Mooney viscosity (M/L 4' at 100° C) of about 20 to about 150. They can be milled, extruded or otherwise processed with or without the conventional compounding ingredients, i.e. fillers such as carbon black, clay, silica, calcium carbonate and titanium dioxide, plasticizers and extender oils, tackifiers, antioxidants and vulcanizing agents such as organic peroxides or the well known sulphur vulcanization systems which generally contain a mixture of about 1 – 5 parts of sulphur per 100 parts interpolymer (phr) and about 1 – 5 phr of one or more accelerators selected from any of the known accelerator classes. Representative examples of such accelerators are an alkyl benzothiazole sulphenamide, a metal salt of a dihydrocarbyl dithiocarbamate, 2-mercapto benzothiazole, 2-mercapto imidazoline. The amounts of filler may vary between about 20 and 150 parts, and extender oil between about 5 and 100 parts, per 100 parts of polymer. The well known compounding and vulcanization technology may be used for these polymers.

The rubber and compounding ingredients can be mixed on a mill or in a Banbury mixer, or in two or more stages using a Banbury followed by mill mixing of the curatives. The components added to the mill or mixer may also include the halogen compound. In accordance with known procedures, the hydrocarbon mineral oil and/or the carbon black may be added to the rubber at the latex stage, i.e. after polymerization and prior to coagulation and recovery of the rubber. The reaction with the halogen compound can take place in the presence of oil and carbon black. After thorough mixing in the normal way, the rubber compound can be extruded into a tire tread, applied to a tire carcass and cured.

The composition may include a mixture of the SBR or NBR polymer described herein and another synthetic rubber such as a regular SBR polybutadiene, or a regular NBR, and the improved green strength properties are observed.

The invention will be further described with reference to the following illustrative specific examples.

EXAMPLE 1

Preparation of tertiary amine group containing rubbery polymer

A rubbery polymer was prepared by polymerizing a monomer mixture of butadiene-1,3, styrene and dimethylaminoethyl methacrylate. The monomer mixture was emulsified in a stirred 40 gallon reactor, in 185 parts by weight of a 3% aqueous solution of a sodium salt of a rosin acid. The reaction was carried out at about 7° C in the presence of a redox catalyst, to about 60% conversion. On completion of the polymerization, the residual monomers were stripped from the latex in the conventional manner.

Portions of this polymer latex were used in the subsequent examples, for reaction with a dihalogen cross-linking agent and testing of the rubber so formed. The polymer contained 23.5 wt.% of styrene, 75.7 wt.% of buradiene and 0.8 wt.% of dimethlaiminoethyl methacrylate.

EXAMPLE 2

The dihalogen compound 4,4' -bis (bromoacetyl) diphenyl methane was added to a portion of the polymer latex of Example 1, and the resulting latex coagulated, and the rubber isolated, dried and tested.

The coagulation procedure took place in two stages. The latex and a hydrocarbon mineral oil were added to a sulphuric acid/brine mixture, and further sulphuric acid was added under agitation, to lower the pH of the latex from about 11 to about 8. Then in a second stage, 0.3 parts by weight per 100 parts by weight of polymer 4,4' - bis (bromoacetyl) diphenyl methane, as a 10% solution in the hydrocarbon mineral oil, and additional sulphuric acid, were added to reduce the pH to about 4 to complete the coagulation. The temperature of the latex, during both stages, was about 60° C. The total amount of oil added was 37.5 parts per hundred rubber (phr).

The mixture was agitated for about 20 minutes, the rubber crumb separated in the normal way, washed twice with water and then dried. The Mooney viscosity of the rubber composition was measured at various times and after various degrees of aging, to observe the effect of the dihalogen cross-linker.

A first control experiment was performed, in which the polymer was not reacted with any dihalogen cross-linker, but was mixed with the same amount of oil. This rubber had a Mooney viscosity (ML-40 at 100° C) of 35.

The green strength polymer and the control polymer were mixed in a Brabender with 50 parts by weight per 100 parts by weight of polymer of carbon black and sheets formed by pressing for green strength measurement.

The results are shown in Table 1.

Table 1

| Mooney data | | |
|---|---|---|
| Mooney (ML 4 at 100° C) | | |
| after 3 hours at room temperature | 66 | |
| 24 hours at room temperature | 64 | |
| 1 day at 60 ° C | 67 | |
| 6 days at 60° C | 67 | |
| Green strength | Experiment | Control |
| Strength at | | |
| 100% elongation (kg/cm$^2$) | 4.9 | 3.0 |
| 200% elongation (kg/cm$^2$) | 6.0 | 2.6 |
| 300% elongation (kg/cm$^2$) | 7.0 | 2.4 |

It can be seen that the Mooney value rapidly rises to an essentially constant value and that the green strength is excellent compared to the control compound.

EXAMPLE 3

The polymer latex of Example 1 was recovered by coagulation (37.5 parts of hydrocarbon oil was also added with the latex) with a sulphuric acid/brine mixture. The recovered polymer was washed and dried.

Using a two roll rubber mill at 49° C, the amounts of the dihalogen compounds shown in Table 2 were mixed into the polymer over a three minute period.

A sample of this polymer was used for Mooney measurement (i.e. zero time) and the remainder was put into a press at 100° C for the times shown and the Mooney measured.

Table 2

| Compound | | 1,4-dibromo-butane-2,3-dione | 1,4 bis (bromoacetyl) diphenyl methane |
|---|---|---|---|
| Quantity of compound g/100g of polymer | | 0.25 | 0.30 |
| Mooney (ML-4 at 100° C) | | | |
| Zero time | | 55 | 36 |
| In press for | 1.5 hrs. | 57 | 70 |
| | 3 " | — | 70 |
| | 3.25 " | 56 | — |
| | 5 " | 57 | 69 |

It is apparent that the dione compound reacts rapidly with the polymer and that the Mooney value does not change much with time. The diphenyl methane compound reacts rapidly with the polymer when aged at 100° C.

EXAMPLE 4

The polymer latex of Example 1 was recovered by coagulation, with no oil addition, with a sulphuric acid/brine mixture.

The polymer was mixed in a Brabender with, per 100 parts by weight of polymer, 37.5 parts by weight of hydrocarbon oil and 0.25 parts by weight of 1,4-dibromobutane-2,3-dione. A portion of this mixture was used for Mooney measurements and a portion was mixed with 50 parts by weight, per 100 parts by weight of polymer, of carbon black and pressed into sheets for green strength measurement.

A control polymer was similarly mixed with the exception that no dione compound was added.

The results are shown in Table 3.

Table 3

|  | Experiment | Control |
|---|---|---|
| Mooney (ML-4 at 100° C) | | |
| Zero time | 59 | 51 |
| 2 hours in press at 100° C | 57 | — |
| 5 hours in press at 100° C | 64 | — |
| Green Strength | | |
| Strength at | | |
| 100% elongation (kg/cm²) | 5.2 | 4.6 |
| 200% elongation (kg/cm²) | 5.8 | 4.5 |
| 300% elongation (kg/cm²) | 7.0 | 4.5 |
| 400% elongation (kg/cm²) | 7.3 | 4.4 |
| 500% elongation (kg/cm²) | 7.0 | 4.2 |

EXAMPLE 5

The polymer of Example 3, recovered as described therein, was mixed on a two roll rubber mill at 49° C with 0.25 parts by weight, per 100 parts by weight of rubber, of 2,2-bis(bromoacetyl) propane, the mixing being for three minutes.

One portion of the mixture was used to determine the Mooney, which was found to be 33. A further portion of the mixture was placed in a press at 100° C. After 0.5 hours in the press, the Mooney value had increased to 45 and after a total of 3 hours in the press the Mooney value had increased to 48.

What is claimed is:

1. A process of preparing a synthetic rubber composition of improved green strength, which comprises reacting an emulsion polymerized rubbery polymer of a $C_4-C_6$ conjugated diolefin or a rubbery polymer thereof with a $C_8-C_{10}$ vinyl or vinylidene substituted aromatic hydrocarbon or with a $C_3-C_5$ vinyl compound having a nitrile group, the rubbery polymer having from about 0.5 to about 10 millimoles per 100 grams of polymer of bound tertiary amine groups incorporated therein by copolymerization with a monomer selected from dimethylaminoethyl acrylate, dimethylaminoethyl methacrylate, diethylaminoethyl acrylate and diethylaminoethyl methacrylate, with a halogen compound, characterized in that the halogen compound has a general formula selected from the group consisting of $$X-CH_2-\overset{O}{\underset{\parallel}{C}}-\overset{O}{\underset{\parallel}{C}}-CH_2-Y$$

and $$X-CH_2-\overset{O}{\underset{\parallel}{C}}-R-\overset{O}{\underset{\parallel}{C}}-CH_2-Y$$

wherein X and Y each represent one of chlorine, bromine or iodine and wherein R represents a. an alkylene group selected from $-CH_2-$, $-CH_2-CH_2-$, $-CH(CH_3)-$ and $-C(CH_3)_2-$, or b. an aromatic group selected from

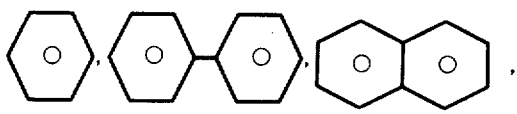

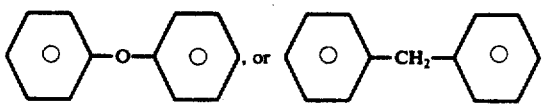

each of which may additionally contain one or more $C_1$ to $C_4$ alkyl substituents on any of the aromatic nuclei, and the location of each $$X-CH_2-\overset{O}{\underset{\parallel}{C}} \quad \text{or} \quad Y-CH_2-\overset{O}{\underset{\parallel}{C}}$$

group is at any of the ortho, meta or para-positions of the aromatic nucleus and in separate aromatic nuclei except where R represents

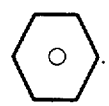

2. The process of claim 1 characterized in that the halogen compound is added to the polymerization latex after termination of the polymerization and that the reaction of the polymer with the halogen compound takes place in the polymerization latex.

3. The process of claim 1 characterized in that the reaction of the polymer with the halogen compound takes place after the polymer has been recovered from the polymerization latex.

4. The process of claim 1 characterized in that the halogen compound is selected from 1,4-dibromobutane-2,3-dione; 1,5-dibromopentane-2,4-dione; and 1,5-dibromo-3,3-dimethylpentane-2,4-dione.

5. The process of claim 1 characterized in that the halogen compound is selected from 1,4-bis(bromoacetyl) benzene; 4,4'-bis(bromoacetyl) diphenyl ether; 2,6-bis(bromoacetyl) naphthalene; 4,4'-bis(bromoacetyl) diphenyl methane; 4,4'-bis(bromoacetyl) diphenyl; 4,4'-bis(chloroacetyl) diphenyl methane; and 4,4'-bis(iodoacetyl) diphenyl methane.

6. The process of claim 1 characterized in that a mixture of butadiene, styrene and dimethylaminoethyl methacrylate is emulsion copolymerized to yield a rubbery polymer containing from 70 to 82 parts by weight of bound butadiene, from 30 to 18 parts by weight of bound styrene and from 0.1 to 1.2 parts by weight of bound dimethylaminoethyl methacrylate and rubbery polymer is reacted, whilst in the polymerization latex, with a halogen compound selected from 4,4'-bis(chloroacetyl) diphenyl methane; 4,4'-bis(bromoacetyl) diphenyl methane; 4,4'-bis(bromoacetyl) diphenyl; and 4,4'-bis(bromoacetyl) diphenyl ether, the amount of halogen compound being such that it contains from 0.1 to 10 millimoles of halogen groups per 100 grams of polymer.

7. The process of claim 1 characterized in that a mixture of butadiene, acrylonitrile and dimethylaminoethyl methacrylate is emulsion copolymerized to yield a rubbery polymer containing from 50 to 80 parts by weight of bound butadiene, from 20 to 50 parts by weight of bound acrylonitrile and from 0.1 to 1.2 parts by weight of bound dimethylaminoethyl methacrylate and the rubbery polymer is reacted, whilst in the polymerization latex, with a halogen compound selected from 4,4'-bis(chloroacetyl) diphenyl methane; 4,4'-bis(bromoacetyl) diphenyl methane; 4,4'-bis(bromoacetyl) diphenyl; and 4,4'-bis(bromoacetyl) diphenyl ether, the amount of halogen compound being such that it contains from 0.1 to 10 millimoles of halogen groups per 100 grams of polymer.

8. A synthetic rubber composition of improved green strength comprising an emulsion polymerized rubbery polymer of a $C_4$-$C_6$ conjugated diolefin or a rubbery polymer thereof with a $C_8$-$C_{10}$ vinyl or vinylidene substituted aromatic hydrocarbon or with a $C_3$-$C_5$ vinyl compound having a nitrile group, the polymer having from about 0.5 to about 10 millimoles, per 100 grams of polymer, of bound tertiary amine groups incorporated therein by copolymerization with a tertiary amine group containing monomer selected from dimethylaminoethyl acrylate, dimethylaminoethyl methacrylate, diethylaminoethyl acrylate and diethylaminoethyl methacrylate, the polymer having been reacted with a halogen compound characterized in that the halogen compound has a general formula selected from the group consisting of

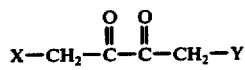

and

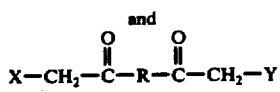

wherein X and Y each represent one of chlorine, bromine or iodine and wherein R represents
a. an alkylene group selected from —$CH_2$—, —$CH_2$—$CH_2$—, —$CH(CH_3)$— and —$C(CH_3)_2$—, or
b. an aromatic group selected from

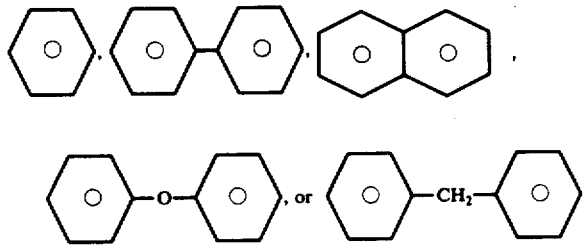

each of which may additionally contain one or more $C_1$ to $C_4$ alkyl substituents on any of the aromatic nuclei, and the location of each

group is at any of the ortho-, meta- or para-positions of the aromatic nucleus and in separate aromatic nuclei except where R represents

9. The composition of claim 8 characterized in that the rubbery polymer is selected from polybutadiene, butadiene-styrene polymers and butadiene-acrylonitrile polymers.

10. The composition of claim 8 characterized in that the halogen compound is selected from 1,4-dibromobutane-2,3-dione; 1,5-dibromopentane-2,4-dione; and 1,5-dibromo-3,3-dimethylpentane-2,4-dione.

11. The composition of claim 8 characterized in that the halogen compound is selected from 4,4'-bis(bromoacetyl) diphenyl ether; 2,6-bis(bromoacetyl) naphthalene; 4,4'-bis (bromoacetyl) diphenyl methane; 4,4'-bis(bromoacetyl) diphenyl; 4,4'-bis(chloroacetyl) diphenyl methane; 4,4'-bis (iodoacetyl) diphenyl methane; and 1,4-bis(bromoacetyl) benzene.

12. The composition of claim 11 characterized in that the rubbery polymer contains from 70 to 82 parts by weight of bound butadiene, from 30 to 18 parts by weight of bound styrene and from 0.1 to 1.2 parts by weight of bound dimethylaminoethyl methacrylate and the amount of halogen compound is such that it contains from 0.1 to 10 millimoles of halogen groups per 100 grams of polymer.

13. The composition of claim 11 characterized in that the rubbery polymer contains from 50 to 80 parts by weight of bound butadiene, from 20 to 50 parts by weight of bound acrylonitrile and from 0.1 to 1.2 parts by weight of bound dimethylaminoethyl methacrylate and the amount of halogen compound is such that it contains from 0.1 to 10 millimoles of halogen groups per 100 grams of polymer.

* * * * *